(12) United States Patent
Rao et al.

(10) Patent No.: US 9,923,780 B2
(45) Date of Patent: Mar. 20, 2018

(54) REFRESH OF THE BINDING TABLES BETWEEN DATA-LINK-LAYER AND NETWORK-LAYER ADDRESSES ON MOBILITY IN A DATA CENTER ENVIRONMENT

(71) Applicant: CISCO TECHNOLOGY, INC., San Jose, CA (US)

(72) Inventors: Girija Raghavendra Rao, Chennai (IN); Victor Manuel Moreno, Carlsbad, CA (US); Marc Binderberger, San Jose, CA (US); Lev Shvarts, San Jose, CA (US); Vrushali Ashtaputre, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 57 days.

(21) Appl. No.: 14/944,685

(22) Filed: Nov. 18, 2015

(65) Prior Publication Data
US 2017/0026246 A1    Jan. 26, 2017

Related U.S. Application Data

(63) Continuation of application No. 14/878,716, filed on Oct. 8, 2015.

(51) Int. Cl.
*H04L 12/24* (2006.01)
*H04L 12/751* (2013.01)

(52) U.S. Cl.
CPC ............ *H04L 41/12* (2013.01); *H04L 45/02* (2013.01)

(58) Field of Classification Search
CPC .......... H04L 4/12; H04L 41/12; H04L 12/463
(Continued)

(56) References Cited

U.S. PATENT DOCUMENTS 8,325,626 B2    12/2012 Tóth et al.
8,549,638 B2 *  10/2013 Aziz .................... G06F 21/568
                                                              726/23
(Continued)

FOREIGN PATENT DOCUMENTS

WO    WO 2013/020126    7/2013

OTHER PUBLICATIONS

U.S. Appl. No. 14/878,716, filed Oct. 8, 2015, entitled "Refresh of the Binding Tables Between Data-Link-Layer and Network-Layer Addresses on Mobility in a Data Center Environment," Inventors: Girija Raghavendra Rao et al.

*Primary Examiner* — Edan Orgad
*Assistant Examiner* — Emmanuel Maglo
(74) *Attorney, Agent, or Firm* — Polsinelli PC

(57) ABSTRACT

A method for assisting communication of a source host upon movement from a first Data center (DC) to a second DC is disclosed. The method includes identifying that the source host has moved from the first DC to the second DC, ensuring that packets identifying a source as the source host in the second DC are copied to a control plane network element, and, for a first destination host identified in a first packet copied to the control plane network element and identified as a host that is not in the second DC, updating an Address Resolution Protocol (ARP)/Neighbor Discovery Protocol (NDP) cache of the source host by sending, to the source host, a first ARP message/unsolicited neighbor advertisement specifying a Media Access Control (MAC) address of an edge router associated with the source host in the second DC as a destination MAC address for the first destination host.

20 Claims, 8 Drawing Sheets

US 9,923,780 B2
Page 2

(58) Field of Classification Search
USPC .......................................................... 370/254
See application file for complete search history.

(56) References Cited

U.S. PATENT DOCUMENTS

| | | | |
|---|---|---|---|
| 8,958,318 B1* | 2/2015 | Hastwell | H04L 63/1408 370/252 |
| 2005/0169193 A1* | 8/2005 | Black | H04L 12/462 370/254 |
| 2007/0239854 A1* | 10/2007 | Janakiraman | G06F 9/4856 709/218 |
| 2008/0084888 A1* | 4/2008 | Yadav | H04L 45/36 370/395.31 |
| 2008/0101381 A1 | 5/2008 | Sun et al. | |
| 2008/0163207 A1* | 7/2008 | Reumann | H04L 63/0263 718/1 |
| 2011/0142053 A1* | 6/2011 | Van Der Merwe | H04L 47/72 370/395.1 |
| 2011/0182295 A1* | 7/2011 | Singh | H04L 41/0816 370/401 |
| 2012/0054367 A1* | 3/2012 | Ramakrishnan | G06F 9/4856 709/242 |
| 2013/0145008 A1* | 6/2013 | Kannan | H04L 45/586 709/223 |
| 2013/0155906 A1* | 6/2013 | Nachum | H04L 61/103 370/255 |
| 2013/0347103 A1* | 12/2013 | Veteikis | H04L 43/04 726/22 |
| 2014/0007089 A1* | 1/2014 | Bosch | G06F 9/5077 718/1 |
| 2014/0025770 A1* | 1/2014 | Warfield | G06F 15/17331 709/213 |
| 2014/0105213 A1* | 4/2014 | A K | H04L 45/74 370/392 |
| 2014/0198808 A1* | 7/2014 | Zhou | H04L 61/103 370/475 |
| 2014/0269321 A1* | 9/2014 | Kamble | H04L 47/31 370/236 |
| 2014/0337824 A1* | 11/2014 | St. John | G06F 9/44521 717/163 |
| 2015/0016286 A1* | 1/2015 | Ganichev | H04L 12/4633 370/252 |
| 2015/0016469 A1* | 1/2015 | Ganichev | H04L 49/90 370/429 |
| 2015/0030024 A1* | 1/2015 | Venkataswami | H04L 45/74 370/392 |
| 2015/0043581 A1 | 2/2015 | Devireddy et al. | |
| 2015/0163192 A1 | 6/2015 | Jain et al. | |

* cited by examiner

| DEST. HOST | L3 ADDRESS | L2 ADDRESS |
|---|---|---|
| A | IP-A | MAC-D1 |
| C | IP-B | MAC-C |

FIGURE 2A

| DEST. HOST | L3 ADDRESS | L2 ADDRESS |
|---|---|---|
| A | IP-A | MAC-A |
| C | IP-B | MAC-S1 |

REFRESH OF THE BINDING TABLES BETWEEN DATA-LINK-LAYER AND NETWORK-LAYER ADDRESSES ON MOBILITY IN A DATA CENTER ENVIRONMENT

CROSS-REFERENCE TO RELATED APPLICATION

This application is a continuation (and claims the benefit under 35 U.S.C. § 120) of U.S. application Ser. No. 14/878,716, filed Oct. 8, 2015, inventors Girija Raghavendra Rao, et al. entitled "REFRESH OF THE BINDING TABLES BETWEEN DATA-LINK-LAYER AND NETWORK-LAYER ADDRESSES ON MOBILITY IN A DATA CENTER ENVIRONMENT." The disclosure of the prior application is considered part of (and is incorporated by reference in) the disclosure of this application in its entirety.

CLAIM OF PRIORITY

This application claims priority to the India Patent Application filed on Jul. 23, 2015, IN Application Serial No. 3793/CHE/2015 and entitled "REFRESH OF THE BINDING TABLES BETWEEN DATA-LINK-LAYER AND NETWORK-LAYER ADDRESSES ON MOBILITY IN A DATA CENTER ENVIRONMENT."

TECHNICAL FIELD

This disclosure relates in general to the field of computer networking and, more particularly, to techniques for Address Resolution Protocol (ARP) and Neighbor Discovery Protocol (NDP) cache refresh on mobility in data centers.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resources as required, including applications, hosts, appliances, and storage. Improving operational efficiency and optimizing utilization of resources in such data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A and 2B are simplified schematic diagrams illustrating ARP entries of an ARP table on a host before and after a move, respectively, according to some embodiments of the present disclosure;

DETAILED DESCRIPTION OF EXAMPLE EMBODIMENTS

Overview

Figure 1A:
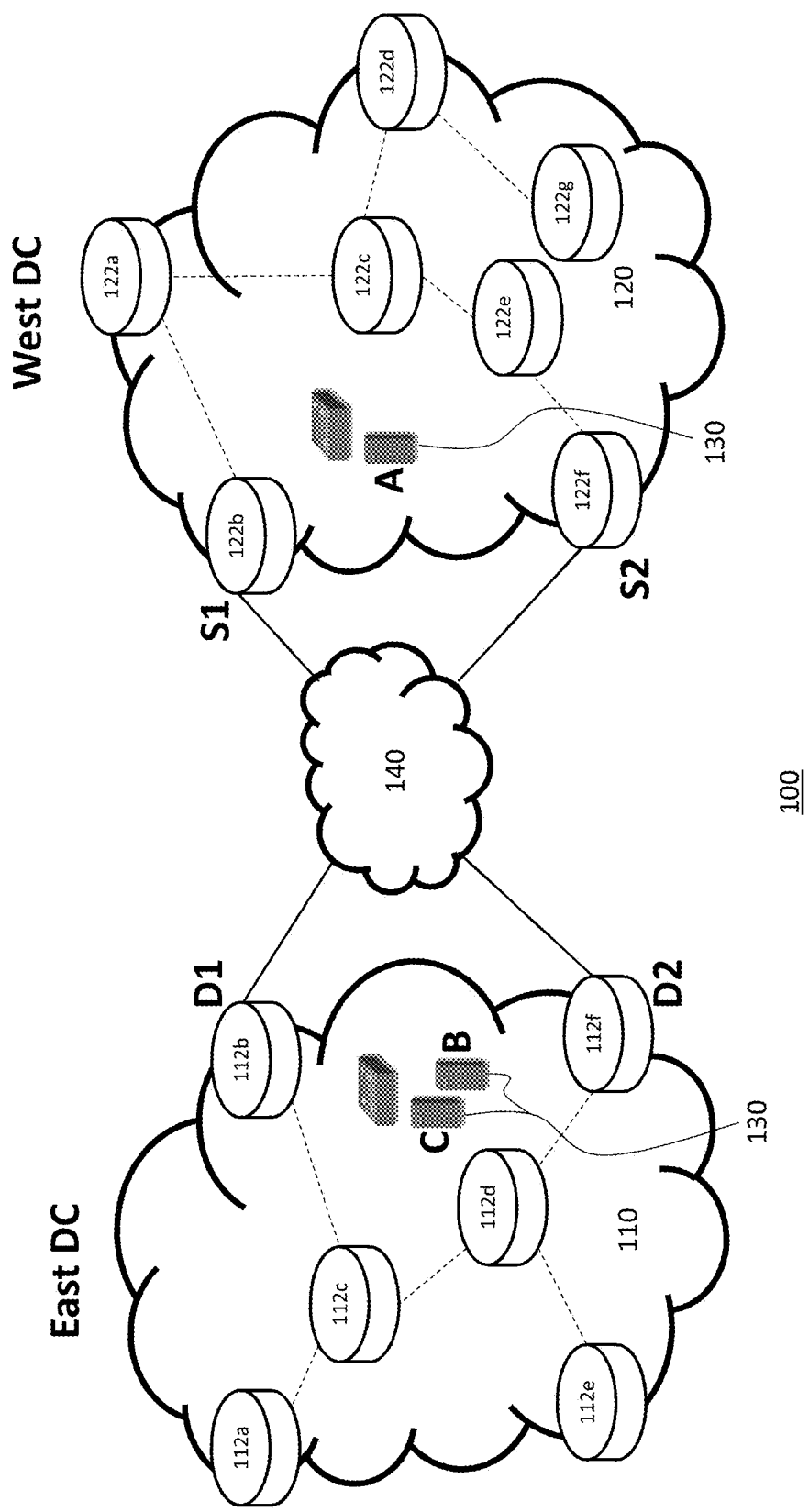
FIGS. 1A and 1B are simplified schematic diagrams illustrating a network comprising multiple DC's and illustrating a source host before and after a move, respectively, according to some embodiments of the present disclosure.

One aspect of the present disclosure provides a method for assisting communication of a source host (e.g. a host denoted "B" in the present FIGUREs) upon movement from a first data center (DC) (e.g. a DC denoted "East DC" in the present FIGUREs) to a second DC (e.g. a DC denoted "West DC" in the present FIGUREs). The method includes identifying that the source host ("B") has moved from the first DC ("East DC") to the second DC ("West DC"). The method also includes ensuring that packets (or, in some embodiments, packet headers) identifying a packet source as the source host in the second DC are selectively copied to a network element, e.g. a control plane network element, e.g. to a list processing (LISP) control plane network element. Copying the packets allows snooping the packets outgoing from the source host after the move. For a first destination host identified in a first packet copied to the control plane network element (i.e., a snooped packet) and identified as a host that is not in the second DC (i.e. a destination host that is remote to the source host after the move of the source host, e.g. a host denoted "C" in the present FIGUREs), the method includes refreshing (i.e. updating) an Address Resolution Protocol (ARP) cache of the source host (i.e. updating an ARP entry for the first destination host within the ARP cache of the source host). The ARP cache of the source host is updated by sending, to the source host, a first ARP message (e.g. a message referred to herein as a "gratuitous ARP message") specifying a data link layer address of an edge router ("S1") associated with (i.e. default for) the source host in the second DC as a destination data link layer address for the first destination host. In some embodiments, data link layer addresses described herein may comprise Layer 2 (L2) addresses of the Open System Interconnect (OSI) model, such as e.g. Media Access Control (MAC) addresses, while network layer addresses described herein may comprise Layer 3 (L3) addresses of the OSI model, such as e.g. Internet Protocol (IP) addresses.

While the above-described aspect relates to update of ARP cache, an Internet Protocol version 4 (IPv4) mechanism, another aspect of the present disclosure provides a similar method for assisting communication of a source host upon movement from a first DC to a second DC, but in the context of Internet Protocol version 6 (IPv6), where a Neighbor Discovery Protocol (NDP) cache, referred to as "neighbor cache," may need to be updated. The method includes identifying that the source host has moved from the first DC to the second DC, ensuring that packets identifying a source as the source host in the second DC are copied to the NDP refresh logic, and for a first destination host identified in a first packet copied to the NDP refresh logic and identified as a host that is not in the second DC, updating a neighbor cache of the source host by sending, to the source host, an unsolicited neighbor advertisement message specifying a data link layer address of an edge router associated with the source host in the second DC as a destination data link layer address for the first destination host.

Since embodiments of the methods described herein involve update of an ARP cache in IPv4 or a neighbor/NDP cache in IPv6, a functional entity performing embodiments of these methods will be referred to in the following as an "ARP/NDP refresh logic." Such a functional entity could be implemented within any network element or distributed among a plurality of network elements associated with the first and/or second DCs, but typically is implemented in a first hop router of a DC to which the source host has moved. In practice, ARP/NDP refresh logic is preferably implemented within each first hop router of all DCs, to ensure that ARP/NDP cache of a source host is properly updated upon a move of the source host to any of the DCs.

As will be appreciated by one of ordinary skill in the art, aspects of the present disclosure, in particular the functionality of the ARP/NDP refresh logic described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded to the existing devices and systems (e.g. to the existing network elements such as the existing routers, switches, various control nodes, etc.) or be stored upon manufacturing of these devices and systems.

Example Embodiments

While details of certain embodiments of the present invention are described with reference to ARP, i.e. an IPv4 mechanism, these teachings are equally applicable, with modifications that would be apparent to a person of ordinary skill in the art based on the descriptions provided herein, to NDP in IPv6 neighbor discovery.

Exemplary Setting for Mobility in Data Centers

For purposes of illustrating the techniques implemented by ARP refresh logic, it is important to understand the activities that may be present in a typical network environment. The following foundational information may be viewed as a basis from which the present disclosure may be properly explained. Such information is offered for purposes of explanation only and, accordingly, should not be construed in any way to limit the broad scope of the present disclosure and its potential applications.

An exemplary network in which embodiments of the present disclosure can be implemented may be viewed as a collection of data centers, where a "data center" (DC) typically refers to a set of network elements, such as e.g. routers, switches, and controllers, as well as hosts connected thereto, that may communicate with one another by routing packets using a common instance of a routing protocol, typically an interior gateway protocol (IGP), and by referring to certain common metrics to define a routing domain governed by the particular instance of the routing protocol. It is possible to use a variety of IGPs, such as e.g. Routing Information Protocol (RIP), Enhanced Interior Gateway Routing Protocol (EIGRP), Open Shortest Path First (OSPF) protocol, interior BGP (iBGP) and Intermediate System-to-Intermediate System (IS-IS) protocol, and sometimes several sets of metrics within a DC to implement the instance of a routing protocol that defines the scope of a data center. It is also possible to use an EGP, such as e.g. external BGP (eBGP), to instantiate the routing domain defining the scope of a data center. Typically, the network elements of a DC are under a single technical administration. Segregation into different DC's allows defining administrative authorities and routing policies of different entities, e.g. of different organizations or different parts of a single organization.

Externally, network elements and hosts of different DC's may communicate with one another by routing packets using an Exterior Gateway Protocol (EGP), such as e.g. using the current Internet standard as BGP Version 4 (BGP-4) defined in RFC 4271. Of course, all other exterior gateway protocols may also be used and are within the scope of the present disclosure.

Another way to look at DCs is to consider that network elements and hosts that may communicate with one another using their respective data link layer addresses (e.g. MAC addresses) belong to one DC and are referred to as "local" to one another. In contrast, if in order for e.g. a first host to communicate with a second host, the first host has to use a data link layer address of its default first hop router, then the second host is in another DC and is referred to as "remote" to the first host.

In various embodiments, a "host" may be or comprise, by way of non-limiting example, any device providing storage, network, or/and computing resource in a data center. Examples of hosts include, but are not limited to, a computer, workstation, server, mainframe, virtual machine (whether emulated or on a "bare-metal" hypervisor), container, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data.

FIG. 1A is a simplified schematic diagram illustrating a network 100 comprising multiple DC's, according to some embodiments of the present disclosure. In the example of FIG. 1A, two DC's are illustrated as a first DC 110, denoted as "East DC" and a second DC 120, denoted as "West DC."

The first DC 110 includes routers 112a-112f, each of which may be operatively coupled to at least one other node within the first DC 110 as shown with solid lines between some of the routers 112a-112f. The lines between some of the routers 112a-112f may be viewed to represent exchange of packets according to one or more IPGs of the first DC 110, such as e.g. iBGP.

Similarly, the second DC 120 includes routers 122a-122g, each of which may be operatively coupled to at least one other node within the second DC 120 as shown with solid lines between some of the routers 122a-122g. The solid lines between some of the routers 122a-122g may be viewed to represent exchange of packets according to one or more IGPs of the second DC 120, such as e.g. iBGP.

Routers in one DC that are configured to communicate with routers in other DC's are referred to as "edge routers", while routers in one DC that are only configured to communicate with other routes in the same DC are referred to as "core routers." In the illustration of FIG. 1A, routers 112a, 112b, 112e, and 112f are edge routers, while routes 112c and 112d are core routers of the first DC 110, while, for the second DC 120, routers 122a, 122b, 122d, and 122f are edge routers and routes 122c, 122e, and 122g are core routers.

Each of the edge routers is configured to communicate, via e.g. external protocol 140 such as e.g. eBGP, with one or more edge routers in another DC. As an illustrative example, the edge routers may be service nodes (e.g. L3VPN, Layer 2 Virtual Private Network (L2VPN) endpoints) that exchange service state via BGP and Label Distribution Protocol (LDP).

In various implementations of embodiments of the present disclosure, a DC may be considered as a physical leaf/spine underlay distributed fabric on which a logical network of hosts is provided as an overlay network. In such implementations, "leaf nodes" may be analogous to what is illustrated in FIG. 1A as edge routers, and "spine nodes" may be analogous to what is illustrated in FIG. 1A as core routers.

Each leaf node in the topology may be a leaf switch that houses one or more network elements, such as e.g. physical servers. Though not illustrated in FIG. 1A, a physical server associated with a leaf switch of each leaf node may be housed in a rack unit or "rack." Additional physical servers may also be housed in the rack. Leaf nodes are responsible for managing communications (e.g., routing and forwarding) originating from and destined for physical servers (and virtual machines and virtual switches hosted by the physical servers) in the rack. Hence, a term "top-of-rack" (ToR) is sometimes ascribed to leaf nodes. Each leaf node may act as a gateway from a Layer 2 network of a DC (e.g. Ethernet) onto the fabric 140 which operates at Layer 3. Therefore, sometimes leaf nodes are also described as "first hop routers" and, in the following, the terms first hop router, edge router, leaf node, and ToR switch may be used interchangeably.

It is appreciated that any number of leaf switches and spine switches may be present in a DC. Furthermore, while a physical leaf/spine topology with tenant overlay networks is used as an example, any network architecture with a physical underlay network and physical and/or logical overlay networks would be consistent with techniques presented herein. In addition, discussions herein are applicable to any IP fabric and presence of the spine nodes is entirely optional. For example, without spine nodes, the leaf nodes could be connected through a full mesh topology.

One or more hosts may be connected to the leaf and/or spine nodes of a DC, shown in FIG. 1A as hosts 130, in particular as hosts B and C in the first DC 110 and host A in the second DC 120, although it is appreciated that any number of hosts may be present in (i.e. connected to) a DC.

In some embodiments, hosts 130 may include virtual switches and virtual machines ("VMs") that may be created and run on a physical server connected to each leaf node on top of a hypervisor (not shown in the FIGUREs). The virtual switches may be configured to manage communications of VMs in particular virtual networks and/or subnetworks ("subnets") and may be embodied by software stored and executed on the corresponding physical server connected to a leaf node, thus performing functions of a physical switch device. Similarly, the VMs may be software stored and executed on the corresponding physical servers connected to the leaf nodes and configured to exchange communications with other VMs. However, embodiments of the present disclosure are not limited to VM hosts and virtual switches. For example, in other typical embodiments, the hosts may include containers and bare-metal workload hosts (i.e. workloads that are not running a VM) that preserve their IP address as the application moves the workloads (example include clustered applications such as oracle RAC, etc.).

Address Resolution Protocol

Address Resolution Protocol (ARP) refers to a telecommunication protocol used for resolution of OSI L3 addresses (i.e. network layer addresses) into OSI L2 addresses (i.e., data link layer addresses). Converting a network layer address, such as e.g. an IPv4 address, to a physical address such as e.g. an Ethernet address, also referred to as a MAC address, provides a critical function in multiple-access networks. While embodiments of the present disclosure are described with reference to IP addresses as network layers addresses and MAC addresses as link layer addresses, ARP may be implemented with many combinations of network and data link layer technologies, such as IPv4, Chaosnet, DECnet and Xerox PARC Universal Packet (PUP) using IEEE 802 standards, FDD, X.25, Frame Relay, and Asynchronous Transfer Mode (ATM), all of which are within the scope of the present disclosure.

ARP is used to populate ARP table (also referred to as "ARP cache") in a device with ARP entries, each entry comprising a network layer address and a data link layer address of one other device with which the first device is or may be communicating. Typically ARP entries are kept in a device for some period of time, as long as it is being used.

Problems Associated with Host Mobility Between Data Centers

Figure 1B:
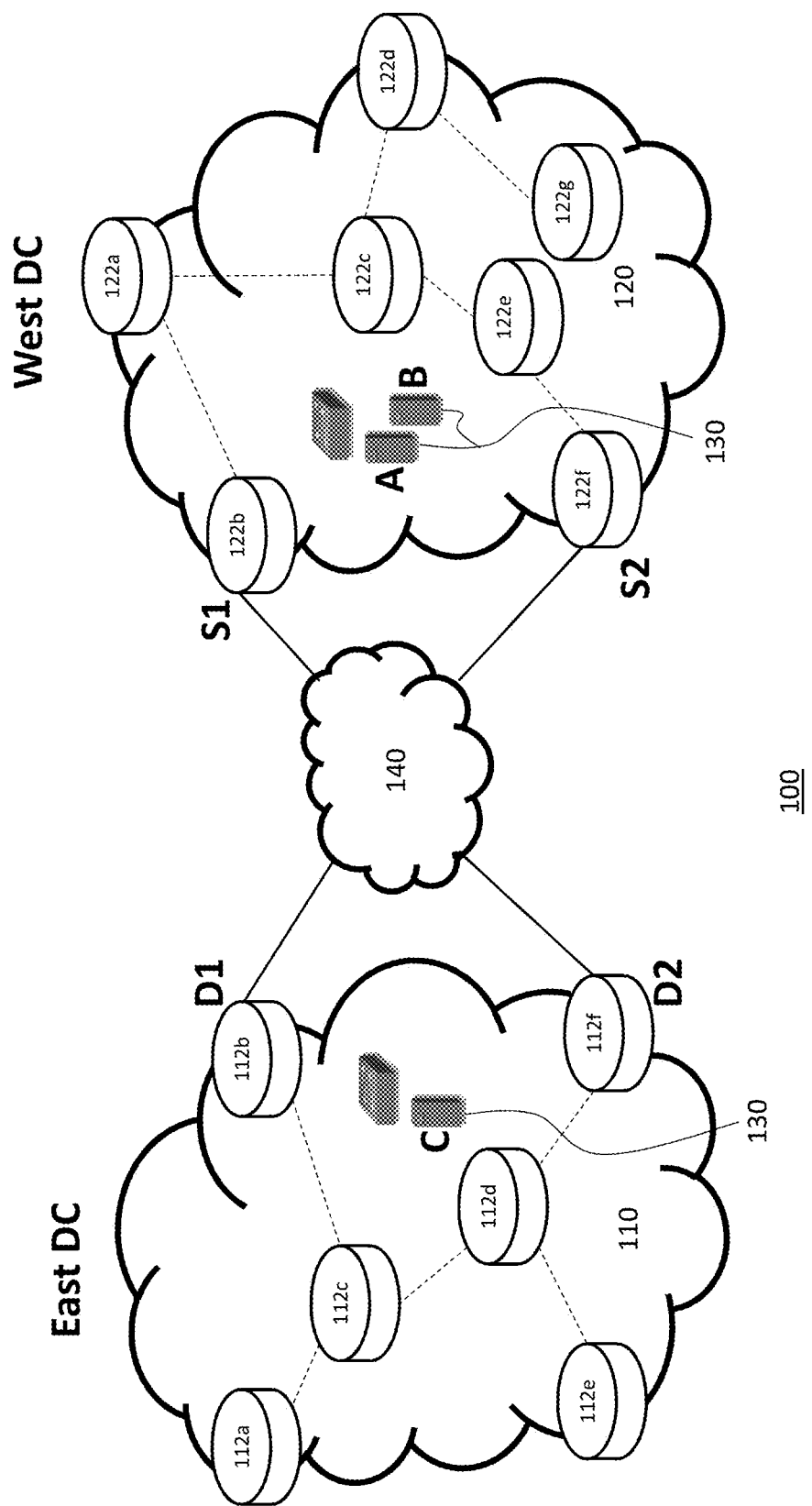

For simplicity, embodiments of the disclosure are further described with reference to the host B moving from the East DC to the West DC, the host B associated with a default gateway in the East DC in the form of the edge router 112b (denoted as "D1" in FIG. 1A) and having a default gateway in the West DC in the form of the edge router 122b (denoted as "S1" in FIG. 1A). However, analogous descriptions are applicable to any other network elements of the network 100. FIG. 1A illustrates host B before the move (i.e., host B is in the East DC), while FIG. 1B illustrates host B after the move (i.e., host B moved from the East DC to the West DC). Except for the difference of the location of host B, descriptions provided above fore FIG. 1A are applicable to FIG. 1B and, therefore, in the interests of brevity, are not repeated here.

Consider a situation of FIG. 1A, where host B is having a conversation (i.e. exchanging data) with hosts A and C. In such a case, an ARP cache on host B will include ARP entries for hosts A and C, as shown in FIG. 2A. Since host B will use this ARP cache to send data to hosts A and C, host B is referred to as a "source host" and hosts A and C are referred to as "destination hosts." Because in the situation of FIG. 1A, hosts B and C are within the same DC (i.e. within the same subnet) and communicate with each other using intra-domain protocols, the ARP cache on host B will indicate MAC address of host C within the East DC subnet (indicated as "MAC-C" in FIG. 2A). Because in the situation of FIG. 1A, hosts B and A are within different DCs (i.e. within different subnets) and communicate with each other using inter-domain protocols, the ARP cache on host B will indicate MAC address for host A as a MAC address of a first hop router (default gateway) associated with host B in the East DC subnet, e.g. router D1 (the MAC address indicated as "MAC-D1" in FIG. 2A).

Consider now that host B moves to another DC, a situation illustrated in FIG. 1B with host B moving to the West DC. Eventually, ARP entries on host B may get refreshed to reflect the move. Until this happens, B will continue to use addresses in accordance with the entries as shown in FIG. 2A to send packets to hosts A and B. However, as a result of the move, A is no longer a remote host to host B and C is no longer a local host to host B, and, therefore their L2 addresses in the ARP cache on host B are incorrect and traffic sent from host B to hosts A and C will get black-holed (i.e. will not reach the desired destination hosts A and C).

Existing Solutions to Enable Communication in Presence of Host Mobility Between Data Centers Various solutions exist to solve the ARP cache problem in a host that has moved to a different data center.

One such solution relies on the use of an L2 extension between two data centers. However, one drawback of such a solution is an implicit requirement to have a technology such as OTV, VPLS, or direct link between two data centers.

Another solution relies on deployment of Mobile IP. However, in case of mobile IP, all traffic has to traverse the home agent (home data center) before being forwarded to the correct data center. Such a solution results in traffic "tromboning" and increased latency.

Yet another solution relies on presence of a virtual switch that may be configured to re-write MAC addresses in packets sent by the moved source host with MAC addresses that reflect the move. However, this solution requires a presence of a virtual switch that can re-write the packet headers with correct MAC addresses and requires additional processing resources for performing the re-write for all packets.

Proposed Solution to Enable Communication in Presence of Host Mobility Between Data Centers Embodiments of the present disclosure aim to provide a technique for assisting communication (in particular, enabling continuation of existing communications) of a source host upon a move from one data center to another data center in a manner that improves on or eliminates at least some of the problems of the existing solutions. To that end, a method is provided that allows refresh of an ARP table on a moved host. Continuing with the example of a move of host B as illustrated in FIGS. 1A and 1B, as a result of performing the ARP refresh method as described herein, the ARP entries on host B for destination hosts A and C will be updated as illustrated in FIG. 2B.

Figure 3:
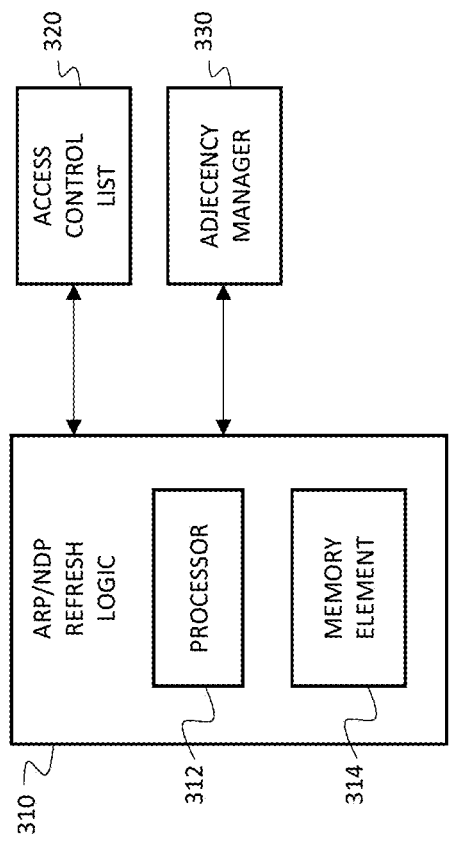
FIG. 3 is a simplified schematic diagram illustrating a functional view of an ARP refresh logic, according to some embodiments of the present disclosure.

FIG. 3 is a simplified schematic diagram illustrating an ARP refresh logic 310, according to some embodiments of the present disclosure. As shown, the ARP refresh logic 310 may include at least one processor 312 and at least one memory element 314, along with any other suitable hardware to enable its intended functionality of ARP refresh on a moved host. Various repositories may be associated with the ARP refresh logic 310, including, but not limited to, an Access Control List (ACL) repository 320 and/or an Adjacency Manager (AM) 330, described in greater detail below.

Even though the ARP refresh logic 300 is not illustrated in the networks illustrated in FIGS. 1A and 1B, the ARP refresh logic 300 may be implemented as or in a network element, e.g. a control plane network element, or distributed over a number of network elements of the network 100. In some embodiments, the ARP refresh logic 300 may be included within at least some, preferably all, leaf nodes (i.e. first hop routers) of each DC, e.g. within the leaf nodes D1, D2, S1, and S2.

In various embodiments, elements of FIGS. 1A-1B and 3 may be coupled to one another through one or more interfaces employing any suitable connections (wired or wireless), which provide viable pathways for network communications. Additionally, one or more of these elements of FIGS. 1A-1B and 3 may be combined, divided, or removed from the architecture based on particular configuration needs. Network environment 100 and ARP refresh logic 300 may include a configuration capable of transmission control protocol/internet protocol (TCP/IP) communications for the transmission and/or reception of packets in the network. Network environment 100 and ARP refresh logic 300 may also operate in conjunction with a user datagram protocol/IP (UDP/IP), any other suitable protocol, or any suitable combination thereof where appropriate and based on particular needs.

Furthermore, in various embodiments, various functionalities described herein may be offloaded to external devices, not specifically described herein. For example, snooped packets described herein could be routed to an external module (e.g. F3 module in N7K switch by Cisco), GARP and PARP messages described below could be offloaded to an F3 ACP Engine, etc.

Figure 4:
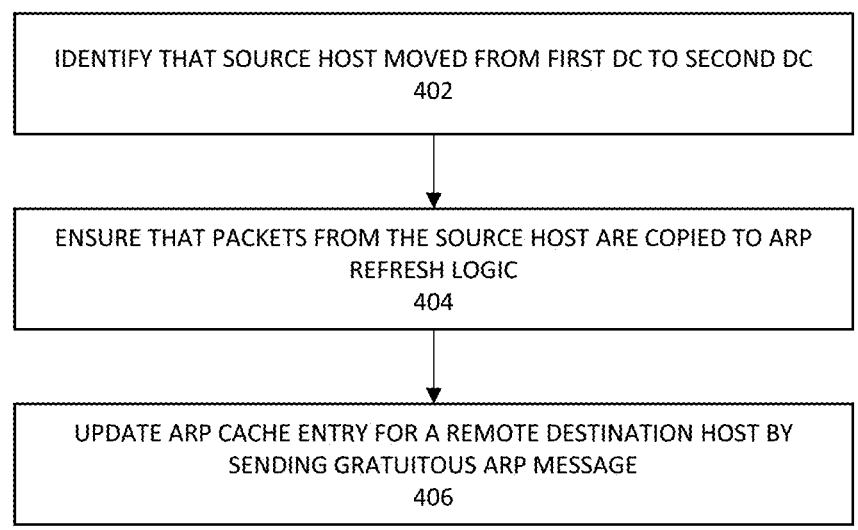
FIG. 4 is a flowchart of method steps illustrating a process for assisting communication of a source host upon movement from a first data center to a second data center, according to some embodiments of the present disclosure.

FIG. 4 is a flowchart 400 of method steps illustrating an ARP refresh process for assisting communication of a source host upon movement from a first DC to a second DC, according to some embodiments of the present disclosure. While the method steps illustrated in FIG. 4, as well as the method steps illustrated in FIGS. 5 and 6 described below, are explained with reference to elements shown in FIGS. 1A-1B and 3, and, in particular, with reference to the example of host B moving from East DC to West DC, described above, any network elements configured to perform these steps are within the scope of the present disclosure.

Figure 7:
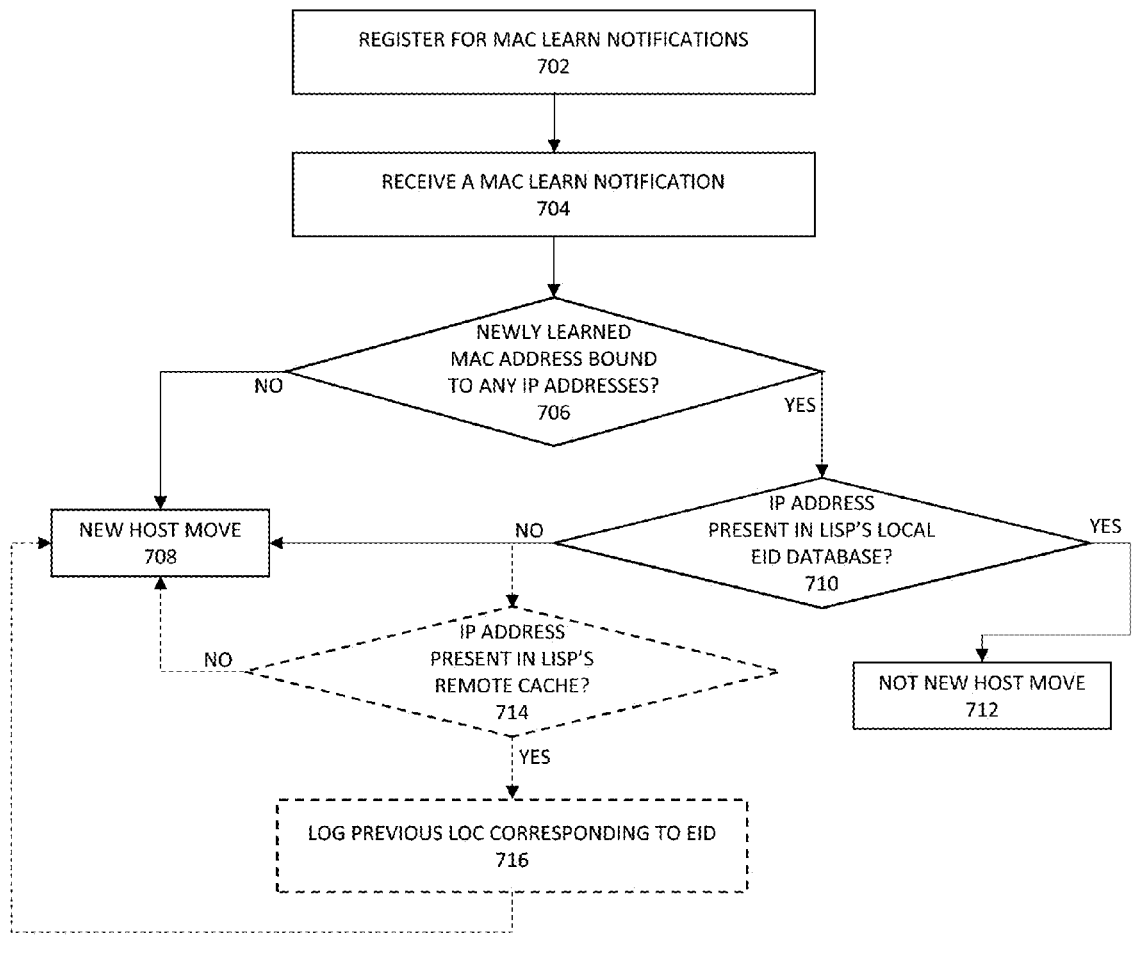
FIG. 7 is a flowchart of method steps illustrating identification of a new host move, according to some embodiments of the present disclosure.

The method 400 may begin with step 402 where the ARP refresh logic identifies that a host has moved from one DC to another DC, e.g. host B moved from East DC to West DC, as explained above. To that end, the ARP refresh logic 300 may be configured to carry out any of the existing methods as known in the art for identifying a "NEW" host move, such as e.g. new source MAC learning, Neighbor detection, or snooping Reverse ARP (RARP) messages sent by moved host. Alternatively or additionally, the ARP refresh logic 300 may be configured to carry out a method for identifying a new host move as illustrated in FIG. 7 and described below.

As a part of identifying that the host has moved, the ARP refresh logic 300 learns the new MAC address of the newly moved host, i.e. the MAC address of source B in the West DC, MAC-B.

In response to (i.e. triggered by) the identification of a new host move, the ARP refresh logic 300 is configured to ensure, in step 404, that all packets sent by the newly moved host B are copied to it. In other words, step 404 ensures that the ARP refresh logic 300 may "snoop" the packets sent by the newly moved host of step 402. As described in greater detail below, snooping is done in order to learn IP addresses of all of the hosts with which the newly moved host is communicating, i.e. to learn IP addresses of all destination hosts for the newly moved source host B.

In one embodiment, snooping of packets may be achieved by changing Access Control List (ACL) of a default edge router associated with the newly moved host in the data center that the host moved to. ACLs are typically maintained in routers in order for the routers to perform policy based routing. Each entry in an ACL defines an access rule defining particular type of traffic and which action is to be performed on the traffic. Typically the actions include PERMIT and DENY, permitting or denying forwarding of the packet. ACLs may be used to snoop packets by specifying an action to copy a packet to a particular predefined location (typically in addition to the PERMIT or DENY action). A particular access rule (i.e. a particular entry of the ACL) that applies to a particular data packet received or transmitted by a router may be ascertained from information in one or more headers of the packet. If two different access rules apply to a given data packet, a router is typically configured to take the action of the rule that is more specific.

Consider that the default router for host B after the move is the edge router S1. In such a case, ACL of S1 is changed in step 404. More specifically, in step 404, the ARP refresh logic 300 may be configured to create an ACL entry, in S1, specifying a source of the packet as either a network layer of host B or a data link layer address of host B in West DC, and specifying the "action" of the ACL entry as copying the packet to the ARP refresh logic. For example, the ARP refresh logic 300 may be configured to create an ACL entry to match the newly learned MAC Source-MAC (B's Source MAC), Destination NOT router-MAC, rate-limit and copy the packets to LISP control plane. Alternatively, the ARP refresh logic 300 may be configured to create an ACL entry to match the IP address of the moved source host (B's Source IP), rate-limit and copy the packets to LISP control plane. In this manner, ACL may be advantageously used for snooping outgoing packets from the newly moved source host.

In an embodiment, the ARP refresh logic 300 may be configured to ensure that the ACL entry created in step 404 expires after a certain time period (either predefined, or dynamically determined by the ARP refresh logic based on various criteria, e.g. based on network load in general, the amount of communications exchanged by host B, etc.), e.g. by setting a timer to clear that ACL entry. In this manner, outgoing packets from the newly moved source host B stop being snooped after a certain time period. The time period should be set such as to reasonably allow learning of all destination hosts with which the newly moved source host is communicating and updating ARP entries of the newly moved source host accordingly.

Thus, ACL may be used to copy packets to the ARP refresh logic. The ARP refresh logic may then analyze the copied packets and update the ARP cache of the newly moved host B accordingly. In particular, for each destination host identified in the copied packets as remote to the newly moved source host B, the ARP refresh logic is configured to send a gratuitous ARP (GARP) message to the newly moved host, the GARP message specifying a data link layer address of the default edge router associated with the newly moved source host in the DC that the host moved to as a destination data link layer address to use for the remote destination host (step 406 shown in FIG. 4). For the scenario considered above, this means that, in step 406, the ARP refresh logic would send a GARP to host B specifying that the MAC address to use for destination host C should be the MAC address of the default edge router S1 that is associated with host B in West DC. In response to receiving such a GARP message, host B will update its ARP cache entry for the remote destination host C accordingly (i.e. the entry in the ARP table of host B for the destination host C will contain information indicated for the destination host C in FIG. 2B).

Therefore, the ARP refresh logic sending such a GARP message to the newly moved source host may be considered as an action causing ARP cache update of the newly moved host (in particular, update of the ARP entry for that particular destination host). If there are other remote destination hosts that host B is communicating with, similar GARP messages are sent for those destination hosts as well, and ARP entries on host B for those destination hosts are updated in a similar manner.

In addition to updating the MAC addresses of the remote destination hosts, the ARP refresh logic may also be configured to update ARP cache entries on the newly moved source host for local destination hosts as well, as needed, as described in greater detail below (not shown in FIG. 4).

Furthermore, in an embodiment that is also not shown in FIG. 4, once an ARP cache entry for a particular destination host (either remote or local) has been updated (or determined to not need an update, which could be the case for local destination hosts, as described in greater detail below), the ARP refresh logic may be configured to create another entry in the ACL of the edge router associated with the newly moved source host (i.e. in the edge router S1). Such a new ACL entry would specify the source of a data packet as described for the first ACL entry above, but also specify the destination of a data packet with an IP address of the destination host for which the ARP cache entry has been updated. The action on such an ACL entry would be to PERMIT the matching packets. Because such an ACL entry would be more specific for packets going from host B to such a specific destination host, the action will take precedence over the first ACL entry (step 404) and packets from host B to this destination host will no longer be copied to the control plane. Such an embodiment provides an optimization reducing control plane traffic by preventing packets from being copied to the control plane network element after an ARP entry for the destination host has been updated in the newly moved source host.

Figure 5:
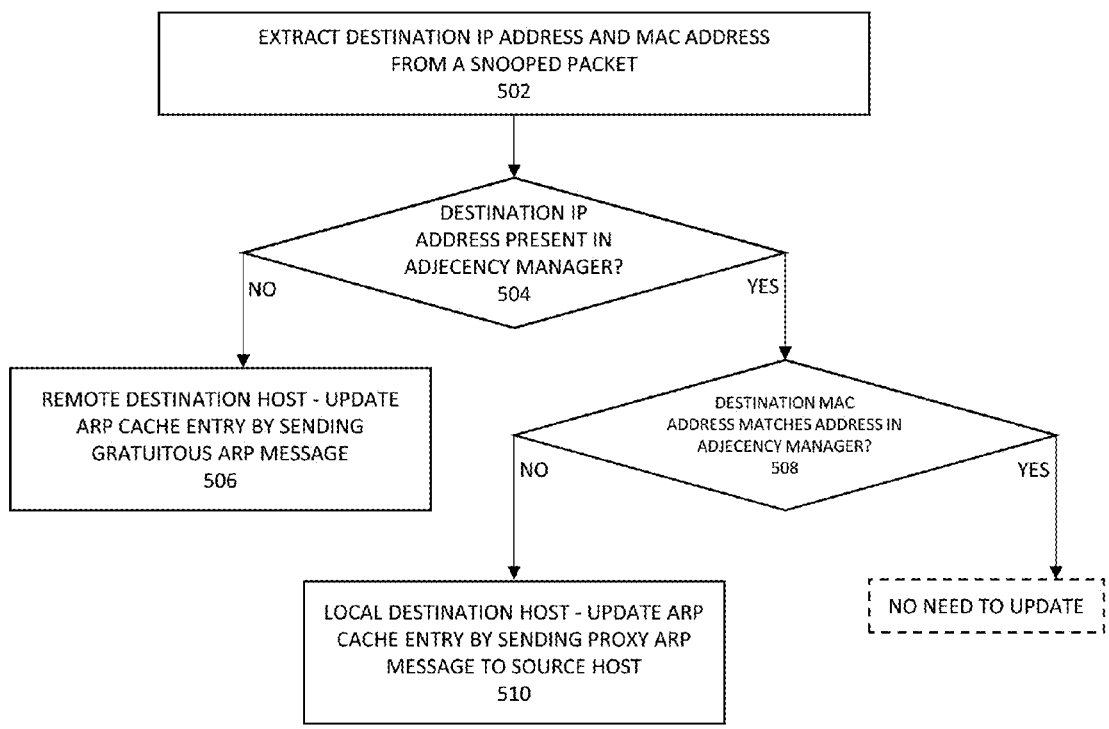
FIG. 5 is a flowchart of method steps illustrating refresh of ARP cache entries on a newly moved source host following lenient mode of operation, according to some embodiments of the present disclosure.
Figure 6:
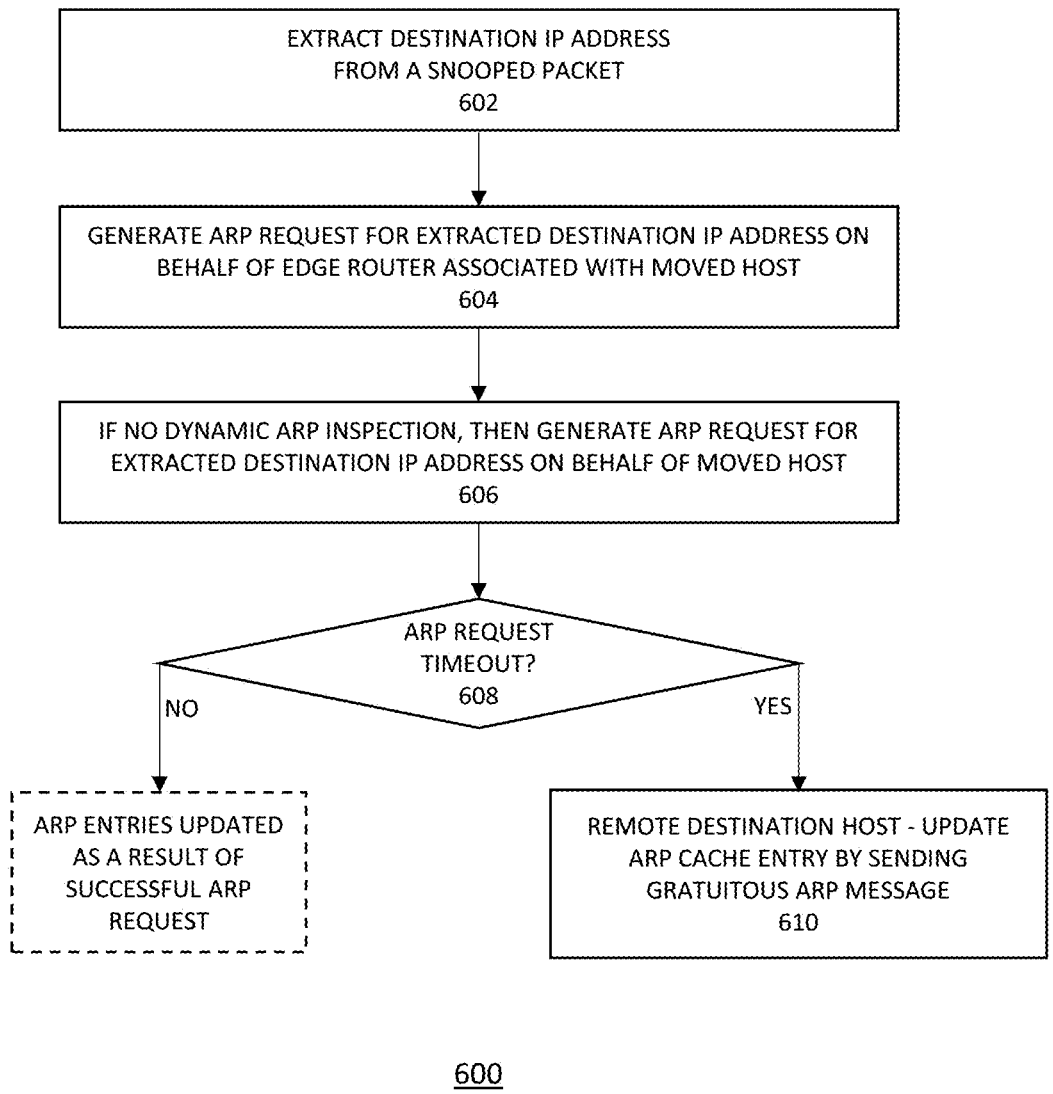
FIG. 6 is a flowchart of method steps illustrating refresh of ARP cache entries on a newly moved source host following strict mode of operation, according to some embodiments of the present disclosure.

Update of the ARP entries on the newly moved source host for both the remote and the local destination hosts may be performed in two different manners, illustrated in FIGS. 5 and 6, respectively. One manner is referred to herein as a "lenient mode of operation" and the other manner is referred to herein as a "strict mode of operation."

FIG. 5 is a flowchart 500 of method steps illustrating refresh of ARP cache entries on a newly moved source host following lenient mode of operation, according to some embodiments of the present disclosure.

The method 500 may be considered as a continuation of the method 400 illustrated in FIG. 4 (therefore, all of the discussions provided above in association with FIG. 4 are applicable to the method 500 as well). In particular, the method 500 may be viewed as method steps performed after step 404 illustrated in FIG. 4 and incorporating the step 406 illustrated in FIG. 4. Continuing with the example of host B moving from East DC to West DC, once the ARP refresh logic 300 ensured that packets sent by the newly moved host B to all of the destination hosts are copied to it (step 404), the ARP refresh logic may be configured to perform method steps 500 for at least some, but preferably each, of the copied packets. In step 502, the ARP refresh logic extracts a destination IP address and MAC address from a particular copied packet being evaluated. In step 504, the ARP refresh logic then checks whether the extracted destination IP address is present in a list of destination IP addresses indicated as IP addresses of hosts that are within/connected to the West DC.

In an embodiment, such a list could be provided in a form of a so-called adjacency manager (AM) table maintained by the edge router associated with the newly moved host B (i.e. by the edge router S1). An AM table typically includes matching of network layer addresses to data link layer addresses for all of the hosts within a DC. Typically, each edge router maintains such an AM table and uses it to route packets for hosts for which the edge router is a default router. Thus, an AM table may be considered as an ARP cache of an edge router associated with the newly moved host (for the example considered herein—ARP cache of the edge router S1). While further discussions will be provided with reference to such an AM table, embodiments of the present disclosure are not limited to such implementation and cover the use of any similar listing maintained by any entity or distributed over a number of entities within or associated with a particular DC.

If, in step 504, the ARP refresh logic determines that the extracted destination IP address for the copied packet is not present in the AM table of West DC, then it means that the destination host identified by this IP address is not in West DC, i.e. that the destination host is a remote host (with respect to the newly moved host B). In this case, the method proceeds to step 506 that is applicable to remote destination hosts, where the ARP refresh logic sends a GARP message as described for step 406 of FIG. 4 (in the interests of brevity, that description is not repeated here).

For example, consider that, in step 502, a copied packet sent from host B to host C is being evaluated. In such a case, the IP address extracted from the copied packet will be "IP-C" and the MAC address extracted from the copied packet will be "MAC-C" because, before the move to West DC, host B used to be local to host C (i.e. host B did not have to use its default router D1 to reach host C but could just use the MAC address of host C, MAC-C). In step 504, the ARP refresh logic will determine that the extracted destination IP address is not in the AM table of the West DC, because host C is not in the West DC host C is in the East DC). Therefore the method will proceed to step 506, where the ARP logic will send a GARP message to the host B causing an update of the ARP entry for host C on host B where a new MAC address for host C will be the MAC address of the default first hop router associated with host B in West DC (i.e. "MAC-S1"). Such a change will properly reflect that, after the move, hosts B and C are remote hosts and host B has to send data to host C by going via a default first hop router of host B (i.e. router S1).

Returning back to the method of FIG. 5, if, in step 504, the ARP refresh logic determines that the extracted destination IP address for the copied packet is present in the AM table of West DC, then it means that the destination host identified by this IP address is in West DC, i.e. that the destination host is a local host (with respect to the newly moved host B). In this case, the method proceeds to step 508, where the ARP refresh logic then checks whether the extracted destination MAC address is present in a list of destination MAC addresses indicated as MAC addresses of hosts that are within/connected to the West DC. Typically, this information will be in the same table as the AM table described above (i.e., a single table includes associations of IP addresses and MAC addresses for all local hosts of a particular DC). However, implementations of a separate listing with MAC addresses (any data link layer addresses) belonging to a particular DC is also within the scope of the present disclosure.

In particular, in step 508, the ARP refresh logic checks whether the MAC address stored in the AM for a host associated with the IP address that matches the destination IP address extracted from a copied packet matches the MAC address extracted from the copied packet. If these two MAC addresses match, then there is no need to update the ARP cache entry on the newly moved host B for this local destination host, as shown with a dashed box "NO NEED TO UPDATE" in FIG. 5. If these two MAC addresses to not match, then, in step 510, the ARP cache logic is configured to generate and send a proxy ARP (PARP) message to the newly moved host, the PARP message indicating that the destination MAC address to use for this destination host should be the MAC address stored in the AM table.

For example, consider that, in step 502, a copied packet sent from host B to host A is being evaluated. In such a case, the IP address extracted from the copied packet will be "IP-A" and the MAC address extracted from the copied packet will be "MAC-D1" because, before the move to West DC, host B used to be remote to host A and had to use its default router D1 to reach host A. In step 504, the ARP refresh logic will determine that the extracted destination IP is in the AM table of the West DC, because host A is in the West DC. Therefore the method will proceed to step 508, where the ARP logic will further determine that the MAC address extracted from the copied packet (i.e. "MAC-D1") does not match the MAC address stored in the AM table of the West DC as associated with the IP address of host A because the AM table will indicate "MAC-A" as the MAC address of host A. Therefore, the method will proceed to step 510, where the ARP logic will send a PARP message to the host B causing an update of the ARP entry for host A on host B where a new MAC address for host A will be the MAC address of host A in West DC (i.e. "MAC-A"). Such a change will properly reflect that, after the move, hosts A and B are local hosts and may communicate by using its local MAC addresses instead of going via a default first hop router.

Thus, in response to receiving a PARP message of step 510, host B will update its ARP cache entry for the local destination host A accordingly (i.e. the entry in the ARP table of host B for the destination host A will contain information indicated for the destination host A in FIG. 2B). Therefore, the ARP refresh logic sending such a PARP message to the newly moved source host may be considered as an action causing ARP cache update of the newly moved host (in particular, update of the ARP entry for that particular destination host). If there are other local destination hosts that host B is communicating with, similar PARP messages are sent for those destination hosts as well, and ARP entries on host B for those destination hosts are updated in a similar manner.

The lenient mode described above relies on the assumption that IP-to-MAC conversion entries in the list maintained by the edge routers of a DC are up to date and correct. When this is not the case, as e.g. can happen if another host in communication with host B moves as well, substantially simultaneously with the move host B, the communication will fail until the mapping systems are updated. The strict mode described below does not rely on such an assumptions.

FIG. 6 is a flowchart 600 of method steps illustrating refresh of ARP cache entries on a newly moved source host following strict mode of operation, according to some embodiments of the present disclosure.

The method 600 may be considered as a continuation of the method 400 illustrated in FIG. 4 (therefore, all of the discussions provided above in association with FIG. 4 are applicable to the method 600 as well). In particular, the method 600 may be viewed as method steps performed after step 404 illustrated in FIG. 4 and incorporating the step 406 illustrated in FIG. 4. Continuing with the example of host B moving from East DC to West DC, once the ARP refresh logic 300 ensured that packets sent by the newly moved host B to all of the destination hosts are copied to it (step 404), the ARP refresh logic may be configured to perform method steps 600 for at least some, but preferably each, of the copied packets. In step 602, the ARP refresh logic extracts a destination IP address from a particular copied packet being evaluated.

Once a destination IP address is extracted from a copied packet, then, in contrast to the lenient approach illustrated in FIG. 5, the ARP refresh logic does not check whether the extracted IP address is present in the AM table of the West DC. Instead, the ARP refresh logic initiates an ARP learning sequence for the extracted IP address of the destination host by sending a broadcast (i.e., to the local broadcast domain) ARP request for the extracted destination IP address on behalf of the edge router associated with the newly moved host B (i.e. on behalf of the edge router S1), shown in FIG. 6 with step 604.

As is known in the art, in general, ARP requests are used as follows. ARP is a protocol that maps IP address to a Data link layer address (MAC Address). That is, it is a method by which any node (e.g. host) on the LAN can dynamically learn the Hardware address of any node on the LAN. A node (e.g. denoted as IP N1) wishing to learn the Hardware address/MAC address of another node (e.g. denoted as IP N2) in the network sends out a Broadcast Request with the Target as N2. Since the request is broadcast, all the nodes in the local broadcast domain will receive this request. However only the node that is identified in the target will send back a response with its Hardware address (if such a node exists in the local broadcast domain), usually directly (i.e. unicast) to the requesting node (the host which sent the ARP request). Thus, ARP requests can be used as a way to probe the local broadcast domain to determine the presence of a particular host.

If dynamic ARP inspection is enabled on the ports of the switches and/or routers to which the destination hosts are connected, then step 606 may be skipped, in which case the ARP cache logic is configured to, upon receiving a response to the request of step 604, generate and send a PARP (i.e. the proxy ARP) message as described above.

If dynamic ARP inspection is not enabled for the destination hosts (e.g. local hosts), then, as a part of the ARP learning sequence, the ARP refresh logic also sends an ARP request for the extracted destination IP address on behalf of the newly moved host B that sent the copied packet being analyzed, shown in FIG. 6 with step 606. In an embodiment, the ARP request of step 606 includes a network layer address ("IP-B") of the source host as an ARP request sender address, a data link layer address of the default edge router associated with the newly moved source host as a source data link layer address of the Ethernet header of the ARP request, and the network layer address of the destination host extracted from the copies packet as a target address of the ARP request (i.e., the subject of the ARP request). For example, if the copied packet being evaluated in the method of FIG. 6 is a packet from newly moved host B to host C, then an ARP request of step 606 will include address IP-B as an IP address of the sender of the ARP request (i.e., host B), address MAC-S1 as a MAC address of the sender of the ARP request, and extracted IP address of host C (IP-C) as the target of the ARP request. If the copied packet being evaluated in the method of FIG. 6 is a packet from newly moved host B to host A, then an ARP request of step 606 will include address IP-B as an IP address of the sender of the ARP request (i.e., host B), address MAC-S1 as a MAC address of the sender of the ARP request, and extracted IP address of host A (IP-A) as the target of the ARP request.

Even though shown in sequence in FIG. 6, in some embodiments, steps 604 and 606 may be performed substantially simultaneously.

In step 608, the ARP refresh logic determines if any ARP request (of the ARP requests of steps 604) timed out. ARP request timeout indicates that the extracted destination IP address for which the request was sent is not local (i.e. is not in West DC). In such a case, the ARP refresh logic establishes that the destination host is a remote host (with respect to the newly moved host B) and the method proceeds to step 610 that is applicable to remote destination hosts, where the ARP refresh logic sends a GARP message as described for step 406 of FIG. 4 (in the interests of brevity, that description is not repeated here).

If there is no ARP request time out in step 608, then the ARP cache entry on host B for the destination host identified by the IP address indicated in the ARP request messages of steps 604 and 606 is updated as a result of successful ARP request(s), as shown with a dashed box "ARP ENTRIES UPDATED AS A RESULT OF SUCCESSFUL ARP REQUEST" in FIG. 6.

For example, consider that, in step 602, a copied packet sent from host B to host C is being evaluated. In such a case, the IP address extracted from the copied packet will be "IP-C". In step 604, the ARP refresh logic will send an ARP request with the subject being the extracted IP address, IP-C, on behalf of the default first hop router associated with host B in West DC (i.e. router S1). If no dynamic ARP inspection is enabled, then in step 606 the ARP refresh logic will also send a similar ARP request on behalf of the moved host B. In step 608, the ARP refresh logic will determine that the ARP requests it sent for the target address IP-C timed out, indicating that the destination IP address extracted from the snooped packet is not local to West DC where host B has moved to. Therefore the method will proceed to step 610, where the ARP logic will send a GARP message to the host B causing an update of the ARP entry for host C on host B where a new MAC address for host C will be the MAC address of the default first hop router associated with host B in West DC (i.e. "MAC-S1"). Such a change will properly reflect that, after the move, hosts B and C are remote hosts and host B has to send data to host C by going via a default first hop router of host B (i.e. router S1).

Now, consider that, in step 602, a copied packet sent from host B to host A is being evaluated. In such a case, the IP address extracted from the copied packet will be "IP-A". In step 604, the ARP refresh logic will send an ARP request with the subject being the extracted IP address, IP-A, on behalf of the default first hop router associated with host B in West DC (i.e. router S1). If no dynamic ARP inspection is enabled, then in step 606 the ARP refresh logic will also send a similar ARP request on behalf of the moved host B. In step 608, the ARP refresh logic will determine that there is no time out of the ARP request(s) sent for the target address IP-A, indicating that the destination IP address extracted from the snooped packet is local to West DC where host B has moved to. As a result of successful ARP request(s), the ARP entry for host A on host B will be updated to make sure that the MAC address for host A in the ARP cache on host B is the MAC address of host A in West DC (i.e. "MAC-A"). Such a change will properly reflect that, after the move, hosts A and B are local hosts and may communicate by using its local MAC addresses instead of going via a default first hop router.

The techniques described herein ensure that the ARP cache of a newly moved host is updated for the destination addresses that the newly moved host is communicating with after the move, thereby avoiding traffic black-holes. The techniques described herein, although specified in the context of IPv4 and ARP, are equally applicable to the Neighbor Solicitation and Neighbor Advertisement handshake used for Neighbor Discovery in IPv6 networks, as described in greater detail below.

The techniques described herein allow for host mobility without a need for tromboning the traffic due to the infrastructure provided by the LISP Mapping System and eliminates a need for an L2 extension to interconnect the data centers, as was done in some prior art approaches. In addition, the techniques described herein do not rely on the use of destination MAC re-write by virtual switches, as was also done in some prior art approaches.

FIG. 7 is a flowchart 700 of method steps illustrating identification of a new host move, according to some embodiments of the present disclosure.

As shown with step 702 in FIG. 7, in order to be able to identify new host moves, the ARP refresh logic, implemented e.g. as the LISP control plane network element, registers with an appropriate network element responsible for providing new MAC learning notifications. In various embodiments, this may be done e.g. with SISF/L2FIB or L2FM. "SISF" refers to "Switch Integrated Security features", an implementation which is responsible for discovering hosts that are local to a site and for detecting moves into the site and away from it. SISF snoops all relevant protocol data and builds a cache of IP-MAC binding. "L2FIB" refers to "L2 Forwarding Information Base" providing a list of MAC addresses learnt on an interface/port, maintained in an RP module in Cisco's Internetworking Operating System (IOS). "L2FM" refers to "L2 Feature manager" responsible for maintaining the MAC addresses learnt on a port. This list is maintained in an SUP module in Cisco's NX-OS network operating system.

At some point after the registration, the ARP refresh logic 300 will receive a notification of a newly learned MAC address (step 704). Upon receiving such a notification, the ARP refresh logic will check whether any IP addresses are bound to the newly learnt MAC address (step 706), e.g. by checking whether this new learnt MAC has MAC-IP binding present in AM table or SISF. If there is no such binding found, it confirms a new host move, as indicated in FIG. 7 with a step 708. If there is such binding, then the method proceeds to step 710, where the ARP refresh logic checks whether the IP address bound to the newly learned MAC address is present in a local End Point Identifier (EID, i.e. an IP address, which identifies the end-point/host) database of the LISP control plane. The LISP control plane typically has databases that maintain the EIDS to RLOC mappings, both for Local EID/RLOC and Remote EID/RLOC. If the EID is already present in the Local EID Database, it signifies that the host is already known, and does not indicate a move, or the actions to be taken after a move are already completed. If the IP address is present in the Local EID Database, then the End point is already known locally, and hence no action is required. Thus, if the determination of step 710 is positive, then no action is required for already present Local EID and the ARP refresh logic can establish that there is no new host move (step 712).

If, however, in step 710 is it determined that the IP address bound to the newly learned MAC address is not present in a local EID, then it confirms the new host move, as indicated with an arrow from the negative outcome of step 710 to step 708.

Optionally, the method 700 may include steps 714 and 716 shown in FIG. 7 (dashed boxes and arrows in this FIGURE illustrate that the steps are optional). In step 714, the ARP refresh logic is configured to check if the IP address bound to the newly learned MAC address is present in LISP's remote EID-to-RLOC (remote location) cache. If not present, then it confirms the move, as indicated with an arrow from the negative outcome of step 714 to step 708. If present, then the ARP refresh logic may be configured to log previous location corresponding to EID (step 716), and the new host move is confirmed, as indicated with an arrow from step 716 to step 708. In other words, consulting Remote EID/RLOC cache (step 714) is an optional step, as irrespective of the result, a host move is assumed. If the IP address bound to the newly learned MAC address is present in the Remote EID, it indicates the EID is known as remote before, which is now a new host, and hence moved in to this data center, and additionally it is possible to log the fact to indicate where it moved from (step 716). If the IP address bound to the newly learned MAC address is not present, it's a new host that has moved into the site.

It should be noted that embodiments of the present disclosure are not limited to LISP. With LISP, it is possible to additionally consult the cache maintained by LISP for detecting Mobility, which is an optimization. Otherwise it is possible to stop by consulting the ARP cache.

In particular, the identification of a new host move described with reference to FIG. 7 is not limited to LISP. For example, as a person of ordinary skill in the art would readily recognize, references to Locators and EIDs described above are made in the context of LISP. However, as used herein, these terms represent a general notion present in any overlay technology. For example, in a Virtual Extensible LAN (VXLAN) implementation, equivalent constructs may be found in the form of VXLAN-Tunnel End-Points (VTEPs) and Hosts corresponding to RLOCs and EIDs respectively.

Neighbor Discovery Protocol

As described above, while embodiments of the present invention are explained herein with reference to ARP, teachings disclosed herein are equally applicable, with modifications that would be apparent to a person of ordinary skill in the art based on the descriptions provided herein, to NDP in IPv6 neighbor discovery. As is known in the art, the NDP is a mechanism in IPv6 that is equivalent to ARP in IPv4. In particular, the Neighbor Solicitation and Neighbor Advertisement exchange in NDP is equivalent to the ARP request and ARP reply exchange used for IPv4 MAC-IP resolution. Below, analogies between IPv4 elements described herein and IPv6 elements are provided, which analogies could be used as a guidance to implementing teachings of the present invention in IPv6 networks. Further, some modifications inherent in switching from the IPv4 context to IPv6 context are discussed.

Concepts like the network layer addresses, data link layer addresses, ACLs, and Adjacency Manager described herein are common to IPv4 or IPv6 embodiments. Further, the "LISP processing control plane network element" described herein in IPv4 would be used in a similar manner in NDP of IPv6.

The ARP cache in IPv4 is analogous to the neighbor cache (or NDP cache) in NDP of IPv6.

The "dynamic ARP inspection" in IPv4 is analogous to a dynamic inspection of the IPv6 Neighbor Cache to achieve similar validation of host addressing consistency in NDP of IPv6.

The "ARP request" in IPv4 is analogous to an Internet Control Message Protocol version 6 (ICMPv6) Neighbor Solicitation in NDP of IPv6. In particular, a successful Neighbor Solicitation in IPv6 results in a meaningful Neighbor Advertisement from the target host and the subsequent population of the Neighbor cache on the requesting host.

In order to enable functionality of an NDP refresh logic in IPv6, the ARP refresh logic in IPv4 described herein would be modified beyond the use of broadcast to accommodate the scoped multicast communications used in NDP of IPv6 for Neighbor Solicitation. To this effect, the NDP refresh logic would include the necessary mechanisms for the router to subscribe to relevant host multicast trees used in IPv6 for distribution of Neighbor Solicitation. One embodiment of such functionality may involve the use of the "all multicast" mode defined for ND Proxy interfaces in RFC 4389, the contents of which are incorporated by reference in their entirety.

The "first ARP message" described herein (also referred to as a "gratuitous ARP message") in IPv4 would be analogous to the unsolicited neighbor advertisement in NDP of IPv6.

The "second ARP message" described herein (also referred to as a "proxy ARP message") in IPv4 would be analogous to a proxy neighbor advertisement in Neighbor Discovery Proxy (ND Proxy) in NDP of IPv6. One embodiment of such functionality may be implemented in compliance with RFC 4389 (ND Proxy).

Thus, the method shown in FIG. 4, in context of IPv6 could be summarized as being modified to use NDP Simple Network Management Protocol version 6 (SNMPv6) neighbor advertisement messages to update the neighbor caches for IPv6 hosts. The steps of the method can be summarized as follows: the detection of the moved host (402), copying packets from the source host to the NDP refresh logic (404) and the update of the Neighbor Cache entry for a remote destination host by sending an unsolicited neighbor advertisement message (406).

The method shown in FIG. 5, in context of IPv6 could be summarized as being modified only for steps 506 and 510 by using NDP SNMPv6 unsolicited and proxy neighbor advertisements for IPv6 hosts. Step 506 of the method would update the IPv6 neighbor cache at the source host by sending an unsolicited neighbor advertisement message when the destination host is deemed to be remote. Step 510 of the method would update the IPv6 neighbor cache at the source host by sending a proxy neighbor advertisement to the source host when the destination host is deemed to be local.

The method shown in FIG. 6, in context of IPv6 could be summarized as extracting the destination IPv6 address from a snooped packet (602), generating a neighbor solicitation SNMPv6 message for the extracted destination IPv6 address on behalf of the edge router associated with the moved host (604), simultaneously generating a neighbor solicitation SNMPv6 message for the extracted destination IPv6 address on behalf of the moved host (only if dynamic neighbor cache inspection is not enabled) (606), evaluating whether the neighbor solicitation sent in 604 will timeout (608), in the event of a timeout deem the destination host as remote and update the neighbor cache by sending an unsolicited neighbor advertisement (610), if the neighbor solicitation in 604 is acknowledged with a valid neighbor advertisement, then the neighbor cache on the source host should be updated on reception of the neighbor advertisement in response to the neighbor solicitation issued in 606.

The method shown in FIG. 7, is applicable in the context of IPv6 in the same way that it is applicable in the context of IPv4 without modification.

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate operations thereof related to the ARP/NDP table (cache) refresh described herein. This may be inclusive of appropriate algorithms and communication protocols that allow for the effective exchange of data or information.

In one implementation, leaf nodes described herein may include software to achieve (or to foster) the ARP/NDP table refresh functions discussed herein, where the software may be executed on one or more processors to carry out the functions. This could include the implementation of instances of programming logic and/or any other suitable element that would foster the activities discussed herein. Additionally, each of the leaf nodes can have an internal structure (e.g., a processor, a memory element, etc.) to facilitate some of the operations described herein. In other embodiments, these functions for the ARP/NDP table refresh may be executed externally to the leaf nodes, or included in some other network element to achieve the intended functionality. Alternatively, leaf nodes may include software (or reciprocating software) that can coordinate with other network elements in order to achieve the functions related to the ARP/NDP table refresh described herein. In still other embodiments, one or several devices may include any suitable algorithms, hardware, software, components, modules, interfaces, or objects that facilitate the operations thereof.

In certain example implementations, functions related to the ARP/NDP table refresh described herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases to enable functions disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the ARP/NDP table refresh described herein. Additionally, each of these devices may include a processor that can execute software or an algorithm to perform the ARP/NDP table refresh as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of the ARP/NDP table refresh, as potentially applied to a myriad of other architectures.

It is also important to note that the steps in the FIGS. 4-7 illustrate only some of the possible scenarios that may be executed by, or within, the ARP/NDP refresh logic described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the ARP refresh logic in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A method for an Address Resolution Protocol (ARP) refresh logic to assist communication of a source host upon movement from a first Data center (DC) to a second DC, the method comprising:
    identifying that the source host has moved from the first DC to the second DC;
    ensuring that packets identifying a source as the source host in the second DC are copied to the ARP refresh logic; and
    for a first destination host identified in a first packet of the packets copied to the ARP refresh logic and identified as a host that is not in the second DC, updating an ARP cache of the source host in the second DC by sending, to the source host in the second DC, a first ARP message specifying a data link layer address of an edge router associated with the source host in the second DC as a destination data link layer address for the first destination host, wherein,
ensuring that packets identifying the source as the source host in the second DC are copied to the ARP refresh logic includes creating a first entry in an access control list (ACL) of the edge router associated with the source host in the second DC, and instructing to copy matching packets to the ARP refresh logic.

2. The method according to claim 1, wherein the first entry specifies a source with either a data link layer address of the source host in the second DC or a network layer address of the source host in the second DC.

3. The method according to claim 2, wherein the first entry in the ACL of the edge router is configured to expire after a predetermined time period.

4. The method according to claim 2, further comprising:
creating a second entry in the ACL of the edge router associated with the source host in the second DC, the second entry specifying a source with either the data link layer address of the source host in the second DC or the network layer address of the source host in the second DC, a destination with a network layer address of the destination host, and instructing to allow matching packets.

5. The method according to claim 1, further comprising:
extracting, from the first packet copied to the ARP refresh logic, a network layer address of the first destination host; and
identifying the first destination host as a host that is not in the second DC by determining that the extracted network layer address of the first destination host is not present in a list of destination network layer addresses indicated as network layer addresses within the second DC.

6. The method according to claim 1, further comprising:
extracting, from a second packet copied to the ARP refresh logic, a network layer address and a data link layer address of a second destination host,
determining that the extracted network layer address of the second destination host is present in a list of destination network layer addresses indicated as local to the second DC;
determining whether the extracted data link layer address of the second destination host matches a data link layer address associated with the extracted destination network layer address in the list of destination network layer addresses; and
when the extracted data link layer address of the second destination host does not match the data link layer address associated with the extracted destination network layer address in the list of destination network layer addresses, sending, to the source host, a second ARP message specifying the data link layer address associated with the extracted destination network layer address in the list of destination network layer addresses as a destination data link layer address for the second destination host.

7. The method according to claim 1, further comprising:
extracting, from the first packet copied to the ARP refresh logic, a network layer address of the first destination host;
generating a first ARP request for the network layer address of the first destination host on behalf of the edge router associated with the source host in the second DC;
if no dynamic ARP inspection is enabled on the first destination host, generating a second ARP request for the network layer address of the first destination host on behalf of the source host in the second DC; and
identifying the first destination host as a host that is not in the second DC by determining that the first ARP request and/or the second ARP request has timed out.

8. The method according to claim 1, further comprising:
extracting, from a second packet copied to the ARP refresh logic, a network layer address of a second destination host;
generating a first ARP request for the network layer address of the second destination host on behalf of the edge router associated with the source host in the second DC; and
if no dynamic ARP inspection is enabled on the second destination host, generating a second ARP request for the network layer address of the second destination host on behalf of the source host in the second DC,
wherein, when neither the first ARP request nor the second ARP requests timed out, the ARP cache of the source host is updated with a data link layer address of the second destination host in the second DC as a destination data link layer address for the second destination host.

9. One or more non-transitory computer readable storage media encoded with software comprising computer executable instructions and, when the software is executed, operable to carry out a method for an Address Resolution Protocol (ARP) refresh logic to assist communication of a source host upon movement from a first Data center (DC) to a second DC, the method comprising:
identifying that the source host has moved from the first DC to the second DC;
ensuring that packets identifying a source as the source host in the second DC are copied to the ARP refresh logic; and
for a first destination host identified in a first packet of the packets copied to the ARP refresh logic and identified as a host that is not in the second DC, updating an ARP cache of the source host in the second DC by sending, to the source host in the second DC, a first ARP message specifying a data link layer address of an edge router associated with the source host in the second DC as a destination data link layer address for the first destination host,
wherein
ensuring that packets identifying the source as the source host in the second DC are copied to the ARP refresh logic includes creating a first entry in an access control list (ACL) of the edge router associated with the source host in the second DC, and instructing to copy matching packets to the ARP refresh logic.

10. The one or more non-transitory computer readable storage media according to claim 9, wherein the first entry specifies a source with either a data link layer address of the source host in the second DC or a network layer address of the source host in the second DC.

11. The one or more non-transitory computer readable storage media according to claim 9, wherein the method further comprises:
extracting, from the first packet copied to the ARP refresh logic, a network layer address of the first destination host; and
identifying the first destination host as a host that is not in the second DC by determining that the extracted network layer address of the first destination host is not present in a list of destination network layer addresses indicated as network layer addresses within the second DC.

12. The one or more non-transitory computer readable storage media according to claim 9, wherein the method further comprises:
   extracting, from a second packet copied to the ARP refresh logic, a network layer address and a data link layer address of a second destination host,
   determining that the extracted network layer address of the second destination host is present in a list of destination network layer addresses indicated as local to the second DC;
   determining whether the extracted data link layer address of the second destination host matches a data link layer address associated with the extracted destination network layer address in the list of destination network layer addresses; and
   when the extracted data link layer address of the second destination host does not match the data link layer address associated with the extracted destination network layer address in the list of destination network layer addresses, sending, to the source host, a second ARP message specifying the data link layer address associated with the extracted destination network layer address in the list of destination network layer addresses as a destination data link layer address for the second destination host.

13. The one or more non-transitory computer readable storage media according to claim 9, wherein the method further comprises:
   extracting, from the first packet copied to the ARP refresh logic, a network layer address of the first destination host;
   generating a first ARP request for the network layer address of the first destination host on behalf of the edge router associated with the source host in the second DC;
   if no dynamic ARP inspection is enabled on the first destination host, generating a second ARP request for the network layer address of the first destination host on behalf of the source host in the second DC; and
   identifying the first destination host as a host that is not in the second DC by determining that the first ARP request and/or the second ARP request has timed out.

14. The one or more non-transitory computer readable storage media according to claim 9, wherein the method further comprises:
   extracting, from a second packet copied to the ARP refresh logic, a network layer address of a second destination host;
   generating a first ARP request for the network layer address of the second destination host on behalf of the edge router associated with the source host in the second DC; and
   if no dynamic ARP inspection is enabled on the second destination host, generating a second ARP request for the network layer address of the second destination host on behalf of the source host in the second DC,
   wherein, when neither the first ARP request nor the second ARP requests timed out, the ARP cache of the source host is updated with a data link layer address of the second destination host in the second DC as a destination data link layer address for the second destination host.

15. A system for an Address Resolution Protocol (ARP) refresh logic to assist communication of a source host upon movement from a first Data center (DC) to a second DC, the system comprising:
   at least one memory configured to store computer executable instructions, and
   at least one processor coupled to the at least one memory and configured, when executing the instructions, to:
      identify that the source host has moved from the first DC to the second DC;
      ensure that packets identifying a source as the source host in the second DC are copied to the ARP refresh logic; and
      for a first destination host identified in a first packet of the packets copied to the ARP refresh logic and identified as a host that is not in the second DC, update an ARP cache of the source host in the second DC by sending, to the source host in the second DC, a first ARP message specifying a data link layer address of an edge router associated with the source host in the second DC as a destination data link layer address for the first destination host,
   wherein
      ensuring that packets identifying a source as the source host in the second DC are copied to the ARP refresh logic includes creating a first entry in an access control list (ACL) of the edge router associated with the source host in the second DC, and instructing to copy matching packets to the ARP refresh logic.

16. The system according to claim 15, wherein the first entry specifies a source with either a data link layer address of the source host in the second DC or a network layer address of the source host in the second DC.

17. The system according to claim 15, wherein the at least one processor is further configured to:
   extract, from the first packet copied to the ARP refresh logic, a network layer address of the first destination host; and
   identify the first destination host as a host that is not in the second DC by determining that the extracted network layer address of the first destination host is not present in a list of destination network layer addresses indicated as network layer addresses within the second DC.

18. The system according to claim 15, wherein the at least one processor is further configured to:
   extract, from a second packet copied to the ARP refresh logic, a network layer address and a data link layer address of a second destination host,
   determine that the extracted network layer address of the second destination host is present in a list of destination network layer addresses indicated as local to the second DC;
   determine whether the extracted data link layer address of the second destination host matches a data link layer address associated with the extracted destination network layer address in the list of destination network layer addresses; and
   when the extracted data link layer address of the second destination host does not match the data link layer address associated with the extracted destination network layer address in the list of destination network layer addresses, send, to the source host, a second ARP message specifying the data link layer address associated with the extracted destination network layer address in the list of destination network layer addresses as a destination data link layer address for the second destination host.

19. The system according to claim 15, wherein the at least one processor is further configured to:
- extract, from the first packet copied to the ARP refresh logic, a network layer address of the first destination host;
- generate a first ARP request for the network layer address of the first destination host on behalf of the edge router associated with the source host in the second DC;
- if no dynamic ARP inspection is enabled on the first destination host, generate a second ARP request for the network layer address of the first destination host on behalf of the source host in the second DC; and
- identify the first destination host as a host that is not in the second DC by determining that the first ARP request and/or the second ARP request has timed out.

20. The system according to claim 15, wherein the at least one processor is further configured to:
- extract, from a second packet copied to the ARP refresh logic, a network layer address of a second destination host;
- generate a first ARP request for the network layer address of the second destination host on behalf of the edge router associated with the source host in the second DC; and
- if no dynamic ARP inspection is enabled on the second destination host, generate a second ARP request for the network layer address of the second destination host on behalf of the source host in the second DC,
- wherein, when neither the first ARP request nor the second ARP requests timed out, the ARP cache of the source host is updated with a data link layer address of the second destination host in the second DC as a destination data link layer address for the second destination host.

* * * * *